United States Patent
Zinser et al.

(10) Patent No.: US 9,596,050 B2
(45) Date of Patent: Mar. 14, 2017

(54) SYSTEM AND METHOD FOR COMMUNICATION

(71) Applicant: GENERAL ELECTRIC COMPANY, Schenectady, NY (US)

(72) Inventors: Richard Louis Zinser, Niskayuna, NY (US); Michael Joseph Dell'Anno, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 636 days.

(21) Appl. No.: 14/089,828

(22) Filed: Nov. 26, 2013

(65) Prior Publication Data

US 2016/0226620 A1 Aug. 4, 2016

Related U.S. Application Data

(60) Provisional application No. 61/844,139, filed on Jul. 9, 2013.

(51) Int. Cl.
*H04K 3/00* (2006.01)
*H04B 1/12* (2006.01)

(52) U.S. Cl.
CPC ............ *H04K 3/228* (2013.01); *H04B 1/126* (2013.01); *H04K 3/825* (2013.01); *H04K 2203/32* (2013.01)

(58) Field of Classification Search
CPC .......... H04K 3/00; H04K 3/228; H04B 1/126
USPC .............. 455/1, 63.1, 63.4, 296; 342/14, 16
See application file for complete search history.

(56) References Cited

U.S. PATENT DOCUMENTS

| | | | |
|---|---|---|---|
| 4,780,721 A | 10/1988 | Dobson | |
| 5,175,558 A | 12/1992 | DuPree | |
| 5,579,016 A | 11/1996 | Wolcott et al. | |
| 5,704,557 A | 1/1998 | Hallett et al. | |
| 6,704,557 B1 | 3/2004 | Krishnamurthy et al. | |
| 6,937,879 B2 * | 8/2005 | Mesecher | H01Q 1/246 342/73 |
| 8,199,681 B2 | 6/2012 | Zinser et al. | |
| 8,630,582 B2 * | 1/2014 | Nogueira-Nine | H04W 24/02 455/25 |
| 9,071,386 B2 * | 6/2015 | Dell'Anno | H04B 1/126 |
| 2011/0249596 A1 | 10/2011 | Ross et al. | |

OTHER PUBLICATIONS

EP Search Report and Opinion issued in connection with corresponding EP Application No. 14176278.1, dated Nov. 26, 2014.

* cited by examiner

*Primary Examiner* — Sonny Trinh
(74) *Attorney, Agent, or Firm* — Nitin N. Joshi

(57) ABSTRACT

A communication system includes an omnidirectional antenna, a beam antenna and a controller. The omnidirectional antenna receives a wideband primary signal and the beam antenna is oriented towards a jammer to receive a jamming signal. The controller subtracts a processed jamming signal from a processed wideband primary signal to produce a jamming cancelled signal.

19 Claims, 4 Drawing Sheets

SYSTEM AND METHOD FOR COMMUNICATION

CROSS REFERENCE TO RELATED APPLICATIONS

The present application claims priority to U.S. provisional patent application Ser. No. 61/844,139 filed Jul. 9, 2013, incorporated herein by reference in its entirety.

BACKGROUND

Embodiments of the present invention relate to a communication system and more specifically to a method for cancelling radio frequency (RF) interference.

RF interference may be classified in two categories, intentional and unintentional. Intentional RF interference also referred to as "radio jamming" is a deliberate attempt by a third party to disrupt communications between two parties. The third party generates interfering radio frequency signals in an area where the two parties are communicating. The interfering radio frequency signals may be at the same frequency as that of the frequency being used by the two parties in communication. On the other hand, unintentional RF interference or jamming occurs when someone unaware of communications between the two parties generates radio frequency signals that interfere with communication between the two parties. Examples of unintentional jamming include interference from non-communication devices such as medical equipment.

In military application, canceling RF interference is of utmost importance so that the missions will not be compromised. There are many hardware as well as software based techniques to cancel the RF interference. One of the techniques to cancel RF interference is to use a directional antenna system. In the directional antenna system, the antennas are oriented to minimize the strength of the undesired transmitter, while maximizing the signal power of the desired transmitter.

While the performance of directional antennas may be satisfactory in some cases, there are many cases where they may not provide performance sufficient to overcome the deleterious effects of the jammer. Thus, there is always a need for even better, RF interference suppression techniques to combat improvements in RF interference techniques.

BRIEF DESCRIPTION

In accordance with an embodiment of the present technique, a communication system is provided. The communication system includes an omnidirectional antenna to receive a wideband primary signal and a beam antenna oriented towards a jammer to receive a jamming signal. The communication system also includes a controller to subtract a processed jamming signal from a processed wideband primary signal to produce a jamming cancelled signal.

In accordance with another embodiment of the present technique, a method of communication is provided. The method includes receiving a wideband primary signal by an omnidirectional antenna and orienting a beam antenna towards a jammer to receive a jamming signal. The method also includes processing the jamming signal and the wideband primary signal and subtracting a processed jamming signal from a processed wideband primary signal to produce a jamming cancelled signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the terms "controller" or "module" refers to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present technique allow the cancellation of remote transmitter/jammer signals through the use of a beam antenna. The beam antenna is pointed at the remote jammer, and the output is connected to a Division Free Duplex (DFD) radio frequency (RF) canceller transmitter input port (TIP) which receives an enhanced signal image of the remote jammer signal. An omnidirectional antenna is co-sited and connected to a receiver input port (RIP). The omnidirectional antenna receives both the jammer signal and a considerably weaker useful remote communication signal. Although, the embodiments have been disclosed with respect to non-cooperative jamming cancellation in a military application, the embodiments are equally applicable to other applications such as cooperative or unintentional jamming for both military and civilian use.

Figure 1:
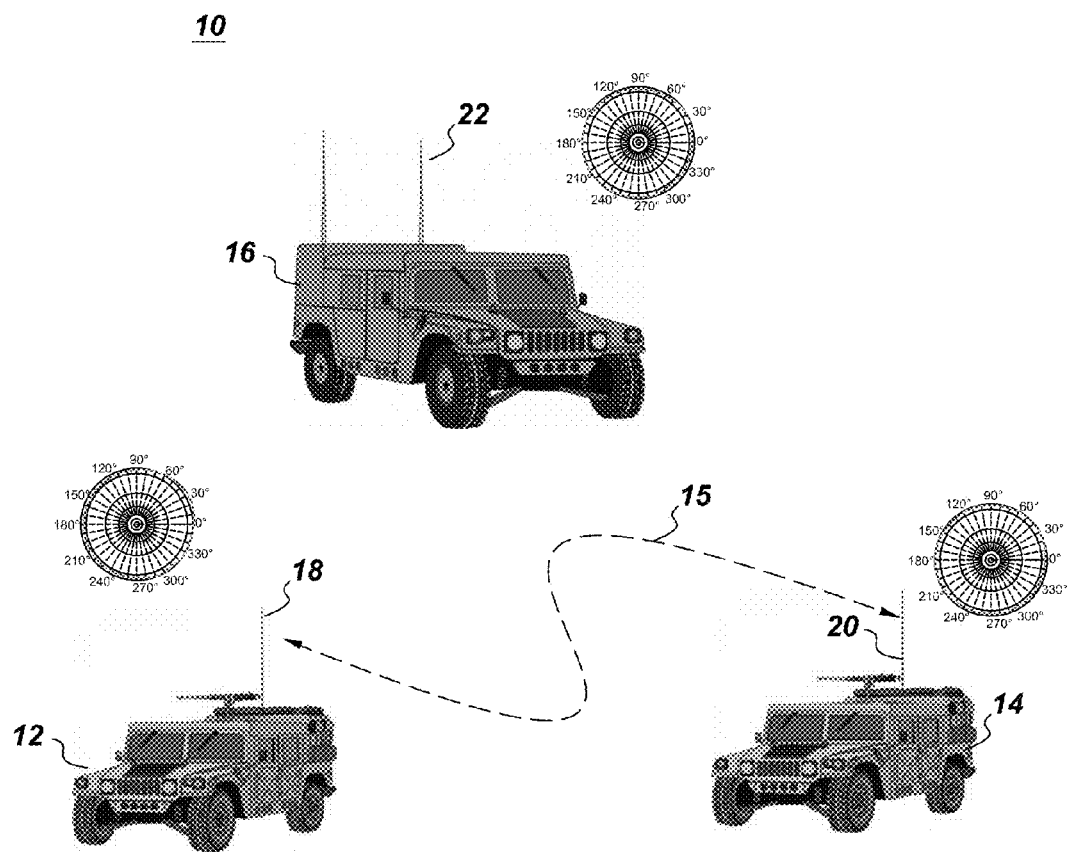
FIG. 1 is a graphical illustration of a typical scenario of non-cooperative jamming.

FIG. 1 shows a graphical illustration 10 of a typical scenario of a non-cooperative jamming. In the illustration 10, two Vehicles 12 and 14 both having at least one omnidirectional antenna 18 or 20 are attempting to communicate in the presence of a jammer 16. Vehicles 12, 14 both may have a transmitter and a receiver and thus may be capable of transmitting or receiving a useful communication signal 15. Jammer 16 is also equipped with an omnidirectional antenna 22 and is located nearby vehicles 12, 14. As shown, jammer 16 is trying to send a jamming signal so as to interfere or jam a communication between vehicles 12 and 14. In an embodiment, the jamming is considered successful if the jamming signal transmitted by jammer 16 is more powerful (i.e., higher decibel (dBm) level) at the locations of vehicle 12 and vehicle 14 than the useful communication signals 15 transmitted by vehicles 14 and 12, respectively.

Figure 2:
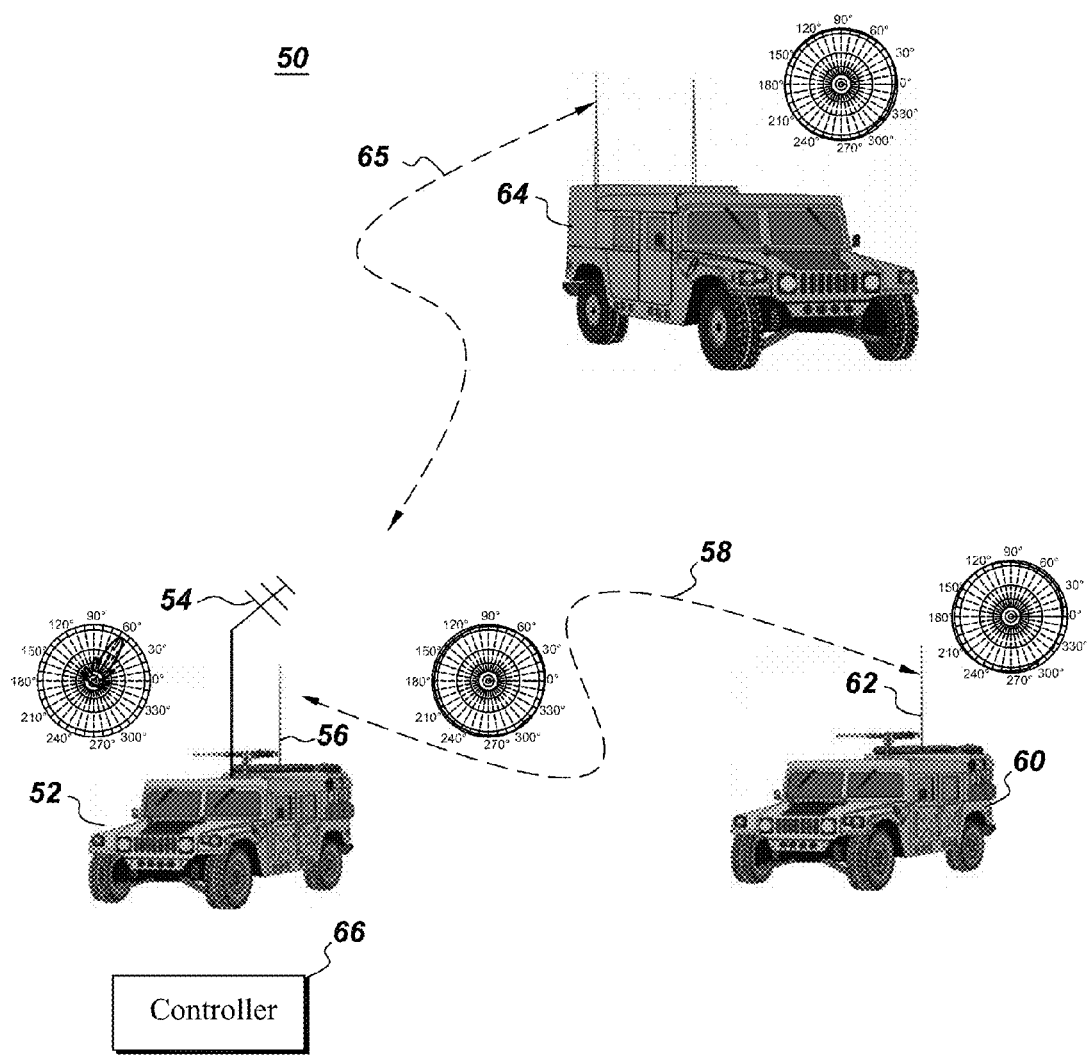
FIG. 2 is a graphical illustration of a jammer cancellation scenario in accordance with an embodiment of the present technique.

FIG. 2 shows a graphical illustration 50 of a jammer signal cancellation scenario in accordance with an embodiment of the present technique. In the illustration 50, a vehicle 52 is trying to receive a useful communication signal 58 from another vehicle 60 in presence of a jammer 64, which as in the earlier case, is trying to jam the communication between vehicles 52 and 60. Vehicle 52 is equipped with a directional antenna 54 oriented in a direction of jammer 64 and an omnidirectional antenna 56. Directional antenna 54 may include a beam antenna. It should be noted that in an embodiment, not only the signals received by beam antenna 54 and omnidirectional antenna 56 would be different but even the strength of signals received by them would be different. For example, since beam antenna 54 is oriented toward jammer 64, beam antenna 54 will receive a jamming signal 65 having a high power whereas omnidirectional antenna 56 will receive a wideband primary signal. In one embodiment, the wideband primary signal comprises all incoming communication signals at the location of vehicle 52 including useful communication signal 58 and jamming signal 65. Vehicle 60 includes an omnidirectional antenna 62 to transmit useful communication signal 58 to vehicle 52.

A controller 66 on vehicle 52 receives both the wideband primary signal and the jamming signal 65. Controller 66 further processes the wideband primary signal and the jamming signal and provides a jamming cancelled signal to vehicle 52 by subtracting a processed jamming signal from a processed wideband primary signal. In one embodiment, processing the wideband primary signal and the jamming signal includes converting both signals into digital signals, adding a delay in the wideband primary signal and filtering the jamming signal.

In one embodiment, beam antenna 54 may include active or passive designs. The passive design may create a beam (higher gain in a single or multiple directions) based upon its physical construction. Furthermore, the passive design beam antenna may be rotated and configured with polarization to change the direction and type of beam received. The active design beam antenna may include either multiple discrete antennas or multiple integrated antennas with adjustable radio frequency (RF) phase shifting components at each antenna. The phase shifting function changes the arrival time of a signal to enable the addition or cancellation of the signals to create a dynamic directional beam.

In one embodiment, orientating beam antenna 54 towards jammer 64 comprises first detecting jamming signal 65 then rotating beam antenna 54 to various directions for testing the strength of jamming signal 65 and orientating beam antenna 54 to a direction which provides a highest strength jamming signal 65. In one embodiment, vehicle 60 may also include a beam antenna (not shown) and a controller (not shown) if vehicle 60 has to receive a communication signal from vehicle 52.

It should be noted that if jammer 64 is coaxial or in line with vehicles 60 and 52 then the beam antenna may pick up both the jamming signal 65 and the useful communication signal 58 with almost equal strength. However, this issue can be mitigated by changing the geometry. In other words, since both vehicle 60 and 52 are mobile either one of them can be moved to make jammer 64 out of line with vehicle 60.

Figure 3:
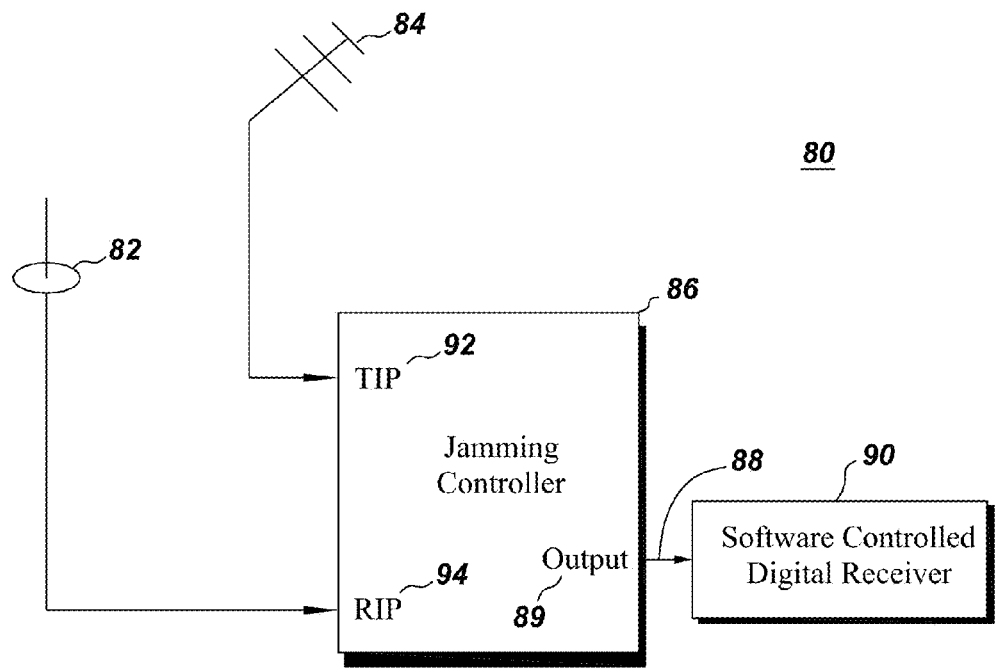
FIG. 3 is a graphical illustration of a communication system utilized in a vehicle in accordance with an embodiment of the present technique.

FIG. 3 shows a graphical illustration of a communication system 80 utilized in a vehicle in accordance with an embodiment of the present technique. Communication system 80 includes an omnidirectional antenna 82 to receive a wideband primary signal, a directional antenna 84 oriented towards a jammer to receive a jamming signal and a jamming controller 86 which generates a jamming cancelled signal 88 at output terminal 89. The directional antenna 84 may include a beam antenna. The resulting jamming cancelled signal 88 from jamming controller 86 may then be input to a software-controlled digital receiver 90 and may be further processed in any suitable manner. In one embodiment, software-controlled digital receiver 90 removes other undesirable signals from jamming cancelled signal 88.

In one embodiment, the output of beam antenna 84 is connected to a transmitter input port (TIP) 92 of jamming controller 86 and output of omnidirectional antenna 82 is connected to a receiver input port (RIP) 94 of jamming controller 86. In general, it is desirable to minimize the presence of received useful communication signal present at the TIP. The architecture shown in FIG. 3 facilitates having higher jammer signal level than the useful communication signal level at TIP 92. In one embodiment, the jammer-to-desired-signal ratio (JSR) at TIP 92 must be at least 4 dB higher than the JSR at RIP 94 to provide effective cancellation of the jamming signal at RIP 94. In other words, advantageously in an embodiment of the present technique, a beam antenna with even less than 10 dB attenuation of the desired signal may also yield good results for jamming signal cancellation.

Figure 4:
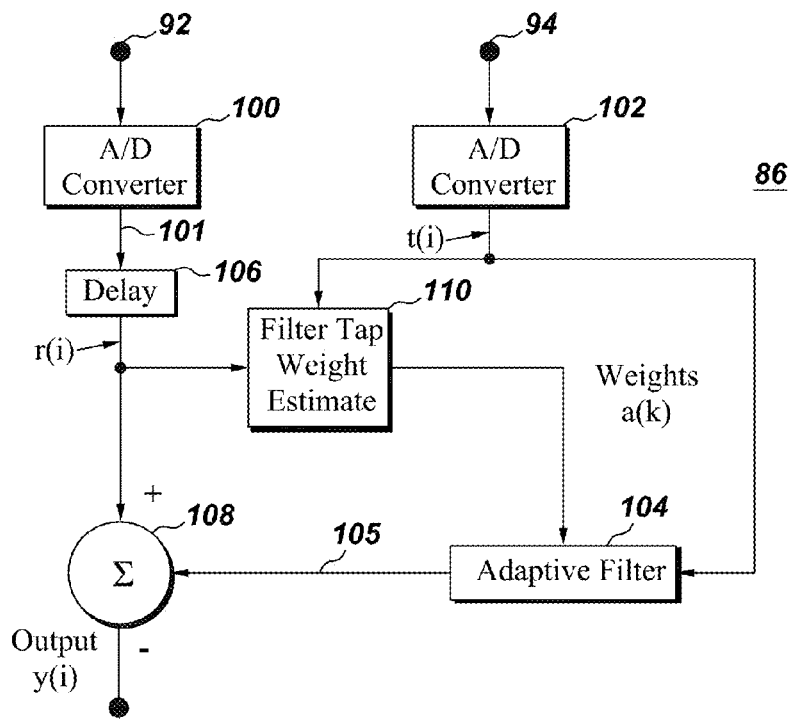
FIG. 4 is a detailed block diagram of a jamming controller of FIG. 3 in accordance with an embodiment of the present technique.

FIG. 4 shows a detailed block diagram of a jamming controller 86 of FIG. 3 in accordance with an embodiment of the present technique. As described with respect to FIG. 3, the wideband primary signal is received at RIP 92 and the jamming signal is received at TIP 94. A first analog to digital (A/D) converter 100 and a second analog to digital converter 102 convert the wideband primary signal and jamming signal into a digital wideband primary signal 101 and a digital jamming signal t(i), respectively. Furthermore, digital jamming signal t(i) is filtered by an adaptive filter 104 and the digital wideband primary signal 101 is delayed by a delay block 106. A filtered jamming signal 105 is then subtracted from a delayed wideband primary signal r(i) by a subtraction block 108 to generate the jamming cancelled signal. In one embodiment, a delay time for delay block 106 is chosen to compensate for any sampling misalignment between the two A/D converters. In another embodiment, a delay equal to about half of a filter length is chosen, as it centers an impulse response of the filter, creating a more linear phase characteristic for the filter.

In one or more embodiments, first analog to digital converter 100 or second analog to digital converter 102 may be a single A/D converter, e.g., a high-speed 14-bit A/D converter. In general, adaptive filtering in adaptive filter 104 involves changing filter parameters over time, to adapt to changing signal characteristics. In one embodiment, adaptive filter 104 may include a finite impulse response (FIR) adaptive filter. In another embodiment, a filter tap weight estimator 110 may be utilized to estimate and update filter parameters for adaptive filter 104. In other words, filter tap weight estimator 110 periodically provides filter tap weight values to adaptive filter 104. In the embodiment shown, filter tap weight estimator 110 provides the filter tap weight values based on two input signals, delayed wideband primary signal r(i) and digital jamming signal t(i). Adaptive filter 104 provides an estimate of the jamming signal that may be subtracted from the received wideband primary signal with subtraction block 108 to provide the jamming cancelled signal. The resulting jamming cancelled signal may then be input to a software-controlled digital receiver 90 (FIG. 3) and may be further processed in any suitable manner.

In one embodiment, the subtraction block difference equation is given by:

$$y(i) = r(i) - \sum_{k=0}^{M-1} a(k) t(i-k) \quad (1)$$

where y(i) are the output samples, r(i) are the delayed wideband primary signal samples (also known as the primary input signal), t(i) are the digital jamming signal samples, M is the length of the adaptive filter, and a(k) are the adaptive filter tap weights. The filter tap weights can be estimated by solution of the following matrix equation:

$$\begin{bmatrix} R_{tt}(0,0) & R_{tt}(0,1) & \ldots & R_{tt}(0,M-1) \\ R_{tt}(1,0) & R_{tt}(1,1) & \ldots & R_{tt}(1,M-1) \\ \ldots & \ldots & \ldots & \ldots \\ R_{tt}(M-1,0) & R_{tt}(1,M-1) & \ldots & R_{tt}(M-1,M-1) \end{bmatrix} \quad (2)$$

$$\begin{bmatrix} a(0) \\ a(1) \\ \ldots \\ a(M-1) \end{bmatrix} = \begin{bmatrix} R_{tr}(0) \\ R_{tr}(1) \\ \\ R_{tr}(M-1) \end{bmatrix} \quad$$

$$\text{where } R_{tt}(j,k) = \sum_{i=M-1}^{N-1} t(i-j)t(i-k) \quad (3)$$

$$\text{and } R_{tr}(k) = \sum_{i=M-1}^{N-1} r(i)t(i-k) \quad (4)$$

and N is the length of the samples over which to estimate the filter tap weights.

Figure 5:
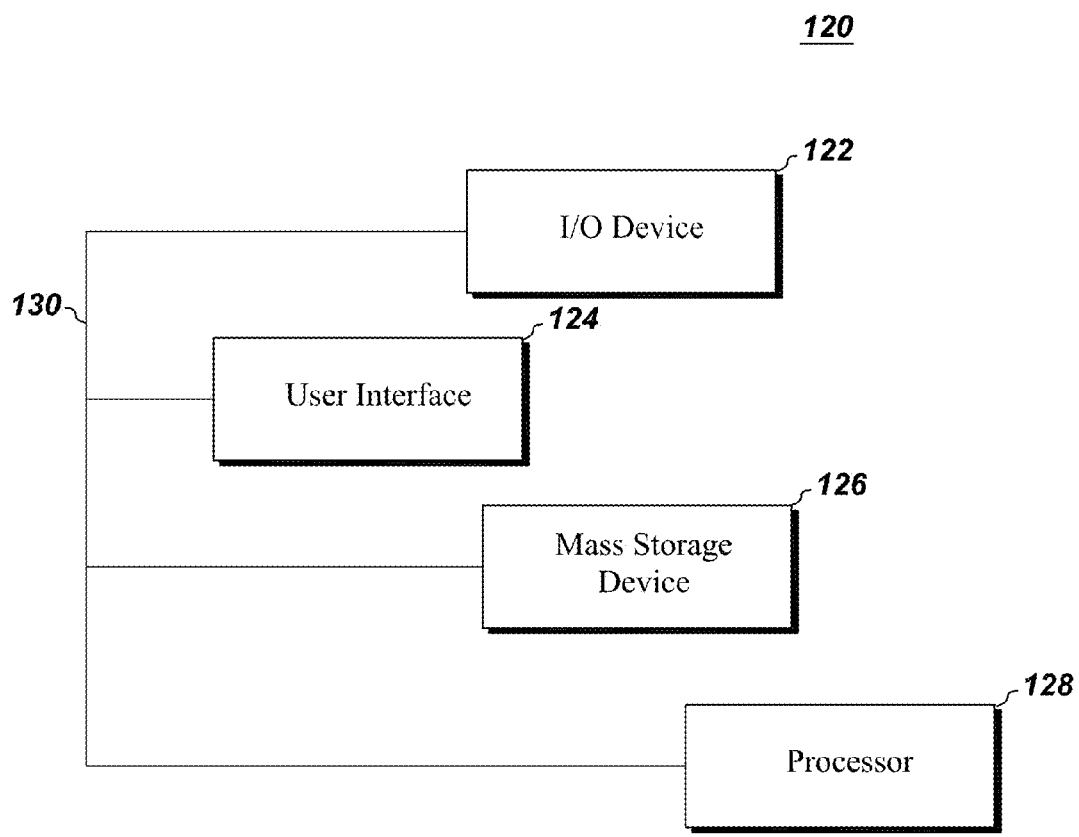
FIG. 5 is a hardware system which may be used in conjunction with the present technique.

FIG. 5 illustrates one embodiment of a hardware system 120 intended to represent a broad category of computer systems such as personal computers, workstations, and/or embedded systems that may be used in conjunction with the present techniques. In embodiments, it is envisioned that communication system 80 (FIG. 3) may include an external control that may include certain hardware and software components for implementing the present techniques, including control of the individual components of system 80. In the illustrated embodiment, hardware system 120 includes processor 128 and mass storage device 126 coupled to high speed bus 130. A user interface device 124 may also be coupled to high speed bus 130. User interface devices 124 may include a display device, a keyboard, one or more external network interfaces, etc. An input/output device 122 may also be coupled to high speed bus 130. In an embodiment, the user interface, for example the display, may communicate certain information related to the status of the operation of the adaptive filter. For example, the display may display information relating to the quality of the jamming signal cancellation.

Advantages of the present technique include superior performance over conventional solutions using directional antennas. For example, an effective jammer cancellation efficacy of 70 to 75 dB may be obtained using a 15 dB gain beam antenna (+5 dB main lobe, −10 dB side lobes). Furthermore, in conventional techniques, a beam antenna is oriented towards a second vehicle with which the user needs to communicate. Since the second vehicle is not stationary, it is difficult to determine its location and place the beam antenna in that direction. On the contrary, with present technique, the user needs to determine only the direction of the jammer and not that of another user with which to communicate. Since the jammer location is generally fixed, it's easier to orient the beam antenna towards the jammer While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A communication system comprising:
an omnidirectional antenna to receive a wideband primary signal;
a beam antenna oriented towards a jammer to receive a jamming signal;
a controller to subtract a processed jamming signal from a processed wideband primary signal to produce a jamming cancelled signal; and
wherein the controller further rotates the beam antenna in various directions to test the power of the jamming signal and orients the beam antenna to a direction which provides a highest power jamming signal.

2. The communication system of claim 1, wherein the beam antenna includes a passive design beam antenna or an active design beam antenna.

3. The communication system of claim 2, wherein the active design beam antenna includes multiple discrete antennas or multiple integrated antennas with adjustable radio frequency (RF) phase shifting components at each antenna.

4. The communication system of claim 1, wherein the processed jamming signal includes a filtered jamming signal and the processed wideband primary signal includes a delayed wideband primary signal.

5. The communication system of claim 4, wherein the controller comprises a first analog to digital converter to convert the wideband primary signal into a digital wideband primary signal.

6. The communication system of claim 5, wherein the controller comprises a delay module to generate the delayed wideband primary signal from the digital wideband primary signal.

7. The communication system of claim 6, wherein the controller comprises a second analog to digital converter to convert the jamming signal into a digital jamming signal.

8. The communication system of claim 7, wherein the controller comprises a digital adaptive filter to generate the filtered jamming signal from the digital jamming signal.

9. The communication system of claim 8, wherein the controller comprises a filter tap weight estimator to determine filter weights for the digital adaptive filter based on the delayed wideband primary signal and the digital jamming signal.

10. The communication system of claim 1, wherein the beam antenna is connected to a transmitter input port and the omnidirectional antenna is connected to a receiver input port of a duplex communication system.

11. A method of communication comprising:
receiving a wideband primary signal by an omnidirectional antenna;
orienting a beam antenna towards a jammer to receive a jamming signal;
processing the jamming signal and the wideband primary signal;
subtracting a processed jamming signal from a processed wideband primary signal to produce a jamming cancelled signal;
wherein orienting the beam antenna towards a jammer includes detecting the jamming signal, rotating the beam antenna in various directions to test the power of the jamming signal and orientating the beam antenna to a direction which provides a highest power jamming signal.

12. The method of claim 11, wherein when the beam antenna, the jammer signal and a useful communication signal are coaxial, moving the useful communication signal out of the line with respect to the beam antenna and the jammer signal.

13. The method of claim 11, wherein processing the jamming signal includes filtering the jamming signal and processing the wideband primary signal includes delaying the wideband primary signal.

14. The method of claim 13, wherein delaying the wideband primary signal includes converting the wideband primary signal into a digital wideband primary signal.

15. The method of claim 14, wherein processing the jamming signal includes converting the jamming signal into a digital jamming signal.

16. The method of claim 15, wherein delaying the wideband primary signal includes providing a delay time so as to allow for sampling misalignment of the digital wideband primary signal and the digital jamming signal.

17. The method of claim 16, wherein filtering the jamming signal comprises generating a filtered jamming signal from the digital jamming signal using a digital adaptive filter.

18. The method of claim 17, wherein the delay time is set to be about one-half of a length of the digital adaptive filter.

19. The method of claim 18, further comprising determining filter weights for the digital adaptive filter based on the delayed wideband primary signal and the digital jamming signal.

\* \* \* \* \*